US011281904B2

(12) United States Patent
Summers

(10) Patent No.: US 11,281,904 B2
(45) Date of Patent: Mar. 22, 2022

(54) AUTOMATIC DETECTION OF DUPLICATE TICKETS IN FEDERATED COLLABORATION SYSTEMS

(71) Applicants: Atlassian Pty Ltd, Sydney (AU); Atlassian, Inc., San Francisco, CA (US)

(72) Inventor: Neil Summers, Mountain View, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 5 days.

(21) Appl. No.: 16/269,462

(22) Filed: Feb. 6, 2019

(65) Prior Publication Data
US 2019/0303666 A1 Oct. 3, 2019

Related U.S. Application Data
(60) Provisional application No. 62/650,794, filed on Mar. 30, 2018.

(51) Int. Cl.
*G06K 9/00* (2006.01)
*G06N 20/00* (2019.01)
*G06N 7/00* (2006.01)
*G06K 9/62* (2006.01)

(52) U.S. Cl.
CPC ..... *G06K 9/00483* (2013.01); *G06K 9/00463* (2013.01); *G06K 9/6256* (2013.01); *G06N 7/005* (2013.01); *G06N 20/00* (2019.01)

(58) Field of Classification Search
CPC .......... G06K 9/00483; G06K 9/00463; G06K 9/6256; G06N 20/00; G06N 7/005; G06N 3/0454; G06N 3/0445; G06N 5/003; G06F 11/00; G06F 11/3072; G06F 16/243; G06F 11/0709; G06F 16/24578; G06F 16/9024; G06F 16/9535; G06Q 10/06; G06Q 30/016; H04L 43/045
See application file for complete search history.

(56) References Cited

U.S. PATENT DOCUMENTS

| | | | |
|---|---|---|---|
| 2017/0199803 A1* | 7/2017 | Bagal | G06F 11/3692 |
| 2018/0025361 A1* | 1/2018 | Ferrarons Llagostera | G06F 16/24578 705/304 |
| 2018/0173495 A1* | 6/2018 | Podder | G06F 11/00 |
| 2019/0130310 A1* | 5/2019 | Madhava Rao | G06F 11/3072 |
| 2019/0253328 A1* | 8/2019 | Kolar | H04L 43/045 |

* cited by examiner

*Primary Examiner* — Jianxun Yang
(74) *Attorney, Agent, or Firm* — Brownstein Hyatt Farber Schreck, LLP

(57) ABSTRACT

A system and method for detecting duplicate tickets submitted to a ticket tracking or issue tracking system. A trained machine learning model can be leveraged to compare tokens representing ticket pairs and/or to determine whether two or more tickets are duplicate tickets, despite that content of those tickets may not be identical.

20 Claims, 4 Drawing Sheets

AUTOMATIC DETECTION OF DUPLICATE TICKETS IN FEDERATED COLLABORATION SYSTEMS

BENEFIT CLAIM

This application claims the benefit under 35 U.S.C. § 119(e) of provisional application 62/650,794, filed Mar. 30, 2018, the entire contents of which are hereby incorporated by reference for all purposes as if fully set forth herein.

TECHNICAL FIELD

One technical field of the present disclosure is repository systems for computer program source code, source code version control management systems and the like. Another technical field is computer-implemented issue tracking systems or trouble ticket systems. Still another technical field is artificial intelligence and machine learning as applied to detecting patterns in electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Professional development of computer programs and complex software systems commonly uses repository management systems in which source code and related artifacts are managed using a controlled storage system. The system may implement version control, commenting, build automation for creating executables, storage of artifacts and ancillary items such as licenses, and other functions. Commercial examples include the BITBUCKET code repository system from Atlassian Pty Ltd. of Sydney, Australia. The system, alone or in conjunction with other systems as part of a federated system, also can implement issue tracking or bug tracking.

Issue tracking systems (variously referred to as trouble ticket systems, support ticket systems, request management systems, and incident ticket systems or ITS) manage the creation and tracking of issues in a variety of contexts. By way of example, an ITS may be implemented in a service desk scenario, in which case the "issues" may be user requests or tickets logged with the service desk. An ITS may be implemented in a project management scenario, in which case "issues" may be project tasks or work items. An ITS may be implemented in a software development scenario, in which case "issues" may be bugs, features currently under development, and/or features intended for future development. An ITS may be implemented in an organizational administration scenario, in which case "issues" may be administrative processes or forms (e.g. leave request processes/forms or the like). Many alternative implementations and types of issues are possible for different implementations of issue tracking systems. Example ITSs include JIRA and JIRA Service Desk, which are commercially available from Atlassian Pty Ltd., Sydney, Australia.

A busy ITS may manage thousands, tens of thousands, or even more issues submitted by users. Each issue may have a different priority, require different actions, and/or be handled by multiple people over its lifecycle.

The use of these systems in large, distributed team development environments creates the risk of duplicate work in which different teams or different team members create functionally equivalent source code and different tickets at different times. The creation of duplicate code and/or duplicate tickets can arise due to inadequate team communication, the use of inconsistent naming or other issues. In large, complex federated systems involving thousands of projects, to date there has been no efficient or effective method of detecting duplicate code or tickets across different teams, projects or systems.

DESCRIPTION OF EXAMPLE EMBODIMENTS

Figure 1:
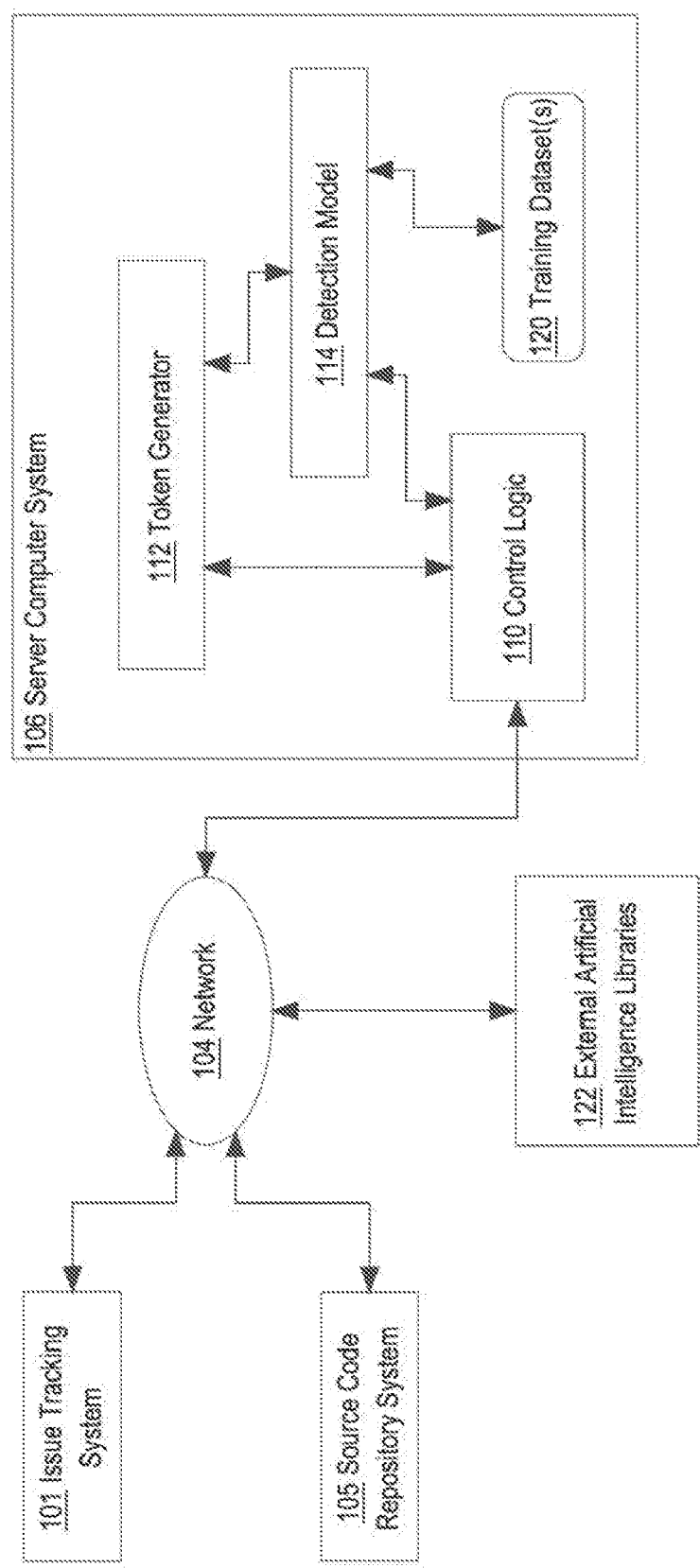
FIG. 1 illustrates a computer system in accordance with an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections according to the following outline:
  1. OVERVIEW
  2. EXAMPLE SYSTEM IMPLEMENTATION
  3. EXAMPLE FUNCTIONAL IMPLEMENTATION
  4. TECHNICAL BENEFITS
  5. MACHINE LEARNING MODELS
  6. IMPLEMENTATION EXAMPLE—HARDWARE OVERVIEW
  7. EXTENSIONS AND ALTERNATIVES

1. Overview

Computer-implemented techniques are provided for using a machine learning system to detect duplicate tickets in federated collaboration systems.

Source code repository systems host computer program source code organized, for example, as files and projects. Issue tracking systems permit creating issues or tickets with description fields that can identify projects, files or segments of program source code for which an issue has been identified. For example, an issue or ticket can comprise a bug report that identifies parts of source code or stack traces that have bugs.

A ticket may be a duplicate of another ticket, referred to herein as a 'duplicate ticket' or a pair of tickets may be a duplicate pair. A duplicate pair is defined by each ticket in a particular pair of tickets being a duplicate ticket of the other ticket in the particular pair of tickets. Thus, each ticket in a duplicate pair is a duplicate ticket.

In an embodiment, a software system is configured or programmed to automatically duplicate tickets using machine learning techniques. Historical ticket data, stack traces, and/or source code identified in the issue tracking system and other content in the issue tracking system can serve as labeled training set data.

Specifically, digitally stored first ticket data for a first plurality of pairs of tickets is received. The digitally stored first ticket data for the first plurality of pairs of tickets includes first digital metadata indicating whether each pair of tickets of the first plurality of pairs of tickets is a duplicate pair. A first set of digitally stored tokens for each ticket of each pair of tickets of the first plurality of pairs of tickets is generated. Using the first set of digitally stored tokens for each ticket of each pair of tickets of the first plurality of pairs tickets as input and the first digital metadata as output, program instructions for training a machine learning model that is programmed to determine whether a pair of tickets is a duplicate pair are executed.

Digital particular ticket data representing a particular ticket is received. Digitally stored second ticket data for a second plurality of pairs of tickets is generated. The digitally stored second ticket data for the second plurality of pairs of tickets includes, for each pair of tickets, the digital particular ticket data representing the particular ticket and the digitally stored first ticket data for a ticket from the first plurality of pairs of tickets. A second set of digitally stored tokens for each ticket of each pair of tickets of the second plurality of pairs of tickets is generated. The machine learning model is evaluated using the second set of digitally stored tokens for each ticket of each pair of tickets of the second plurality of pairs of tickets as input, resulting in receiving output from the machine learning model specifying whether each pair of tickets of the second plurality of pairs of tickets is a duplicate pair.

In an embodiment, stack traces and/or source code associated with each ticket of the first and second plurality of pairs of tickets may be tokenized and used to train the machine learning model.

Other aspects, features and embodiments will become apparent from the disclosure as a whole. The described embodiments provide significant improvements to providing duplicate ticket detection to users in federated systems. Due to the ability to accurately detect duplicate tickets, storage space associated with an issue tracking system can be drastically improved by removing duplicates from the system. Additionally, using the techniques described herein, duplicate detection may prevent segregated branches of the same issue that may lead to duplicate efforts and resolutions by users of an ITS. Thus, eliminating duplicate tickets may reduce duplicate efforts in a workplace and vastly improve workplace efficiency and production. These techniques offer, in addition to the improvements discussed above, reduced usage of network bandwidth, CPU cycles, storage, and/or memory because of the efficiency and efficacy of the algorithms that are disclosed.

2. Example Computer System Implementation

Training a classifier, neural network or other machine learning system may comprise transforming copies of source code into tokenized representations that are amenable to storage in a manner that separates functional information from the strict syntax of the program(s). Datasets comprising sequences of tokens then can be used as labeled training sets to cause the machine learning system to accurately identify functionally similar code in other programs, based on tokenizing the other programs and evaluating the resulting token stream using the classifier, neural network or other machine learning system.

FIG. 1 illustrates a computer system that may be used to implement an embodiment of the invention.

In the example of FIG. 1, an issue tracking system 101 and a source code repository system 105 are communicatively coupled via network 104 to a server computer 106. The source code repository system 105 hosts computer program source code organized, for example, as files and projects. The source code repository system 105 may implement version control, commenting, build automation for creating executables, storage of artifacts and ancillary items such as licenses, and other functions. The issue tracking system 101 supports creating issues or tickets with description fields that can identify projects, files or segments of program source code for which an issue has been identified. For example, an issue or ticket can comprise a bug report that identifies parts of source code that have bugs. Each of the issue tracking system 101 and a source code repository system 105 further comprises one or more data repositories which may be implemented as relational databases, object databases, column store databases or other data storage systems. Commercial examples include the BITBUCKET code repository system and the JIRA issue tracking system from Atlassian Pty Ltd. of Sydney, Australia.

Issue tracking system 101 may be configured to store a wide variety of information in respect of a given issue. An issue may also be referred to herein as a 'ticket'. In one form, an issue item as represented in the issue tracking system 101 comprises a plurality of data fields that are representative of the content of an issue. Preferably, at least some of the information required for those data fields are provided by a user when entering a user request into the system. Issue tracking system 101 extracts relevant data from the information provided by a user and stores such data in appropriate data fields of an issue item. The actual data fields of an issue vary depending on the requirements of a given ITS implementation. In the present disclosure, an issue may contain one or more of the following data fields: a key field storing a unique identifier for the issue (e.g. a serial number), a time field indicating the time that an issue has been created in the system, an ITS client identifier indicating which ITS client computer the user request is submitted from (e.g. user ABC), a summary field storing a brief summary of the user request entered by a user (e.g. Can I get a trackpad), and a request type field indicating the category information of the user request (e.g. workspace request, hardware request etc.). The category information may be indicative of the nature of the user request, type of assistance required, type of action required, responsible service desk, whether an automated response or action can/should be triggered by the item, or similar.

An issue may be created with additional data fields, such as: a status field indicating the stage an issue is currently at in its lifecycle, an assigned person field indicating who (if anyone) an issue has been assigned to, a severity field storing the severity of an issue (e.g. critical, major, minor), a priority field storing the priority of an issue at a general level (e.g. urgent, high, low, etc.), a rank field storing a rank value in respect of an issue (defining a rank order of the request relative to other requests), a project field storing a project to which the issue belongs, a description field storing a description of the issue and actions taken with respect to the issue. It will be appreciated that an issue can be created with one or a plurality of the above data fields based on the requirements of a given ITS implementation. The user may be required to manually enter some of the data field information mentioned above, and/or the ITS client or server may automatically populate some data field information for the request. The actual fields defined with respect to an issue type will depend on the requirements of a given ITS implementation, and many other fields are possible.

In one embodiment issues are stored in a relational database. Issues could be stored in a single table data structure (which may be appropriate for relatively simple ITSs) where the single table stores all relevant issue data. Table 1 provides an example of a simple single table data structure for storing issues:

TABLE 1

| Key | Project ID | Description | Status | Priority | Rank | . . . . . . |
|-----|------------|-------------|--------|----------|------|-------------|

The network 104 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

Server computer system 106 may comprise one or more cores, processors, computers, and/or virtual machine instances hosted on the premises of an enterprise or using a public or private cloud computing facility. In an embodiment, server computer system 106 hosts or executes control logic 110 which may comprise a token generator 112, detection model 114 and one or more training dataset(s) 120.

In an embodiment, the token generator 112 is programmed or configured to receive computer program source code or computer program stack traces as input, for example from the source code repository system 105, and to transform lines of source code or stack traces into streams of digitally stored tokens in memory. In an embodiment, the token generator 112 is programmed or configured to receive digital data representing tickets or issues as input, for example from the issue tracking system 101, and to transform tickets into streams of digitally stored tokens in memory. Token streams may be used for two purposes: to generate data for training a neural network, classifier or other machine learning system, resulting in training datasets 120 and updating the detection model 114; or to generate data from source code, stack traces, or tickets that are to be validated against the detection model 114. In an embodiment, the detection model 114 also receives, for training purposes, content from other elements of the system, such as text from issues or tickets managed in the issue tracking system 101. Text, images, data objects or other content may or may not be tokenized via the token generator 112 as part of training or validation, depending upon the format of the input data. Thus, a machine learning model is trained using data obtained from multiple different sources of a federated system including but not limited to computer program source code from a source code repository system and issues, issue content or issue metadata from an issue tracking system or trouble ticket system.

The control logic 110 is further coupled to external artificial intelligence libraries 122. In an embodiment, libraries 122 implement neural network functions, classifier functions, or other machine learning functions and may be imported, statically or dynamically linked, called or programmatically integrated into or coupled to the detection model 114 using other means. In an embodiment, libraries 122 comprise the TensorFlow system, which is publicly available under open-source licensing.

Using a computer system architecture of this arrangement, the issue tracking system 101 may support the creation of issues or tickets that include links to stack traces or source code. In response to creation of an issue in the issue tracking system, the control logic 110 may obtain a copy of the issue data and metadata, and use it to train the detection model 114. Thereafter, the detection model may be used to duplicate code and/or tickets when they are submitted for evaluation using the model.

Training the detection model 114 may comprise transforming copies of source code or issue content into tokenized representations using the token generator 112. Token streams may be amenable to storage in a manner that separates functional information from the strict syntax of the program(s). Datasets comprising sequences of tokens then can be used as labeled training sets to cause the machine learning system to accurately identify functionally similar tickets and/or code in other programs, based on tokenizing the other tickets and code and evaluating the resulting token stream using the classifier, neural network or other machine learning system.

3. Example Functional Implementation

Figure 3:
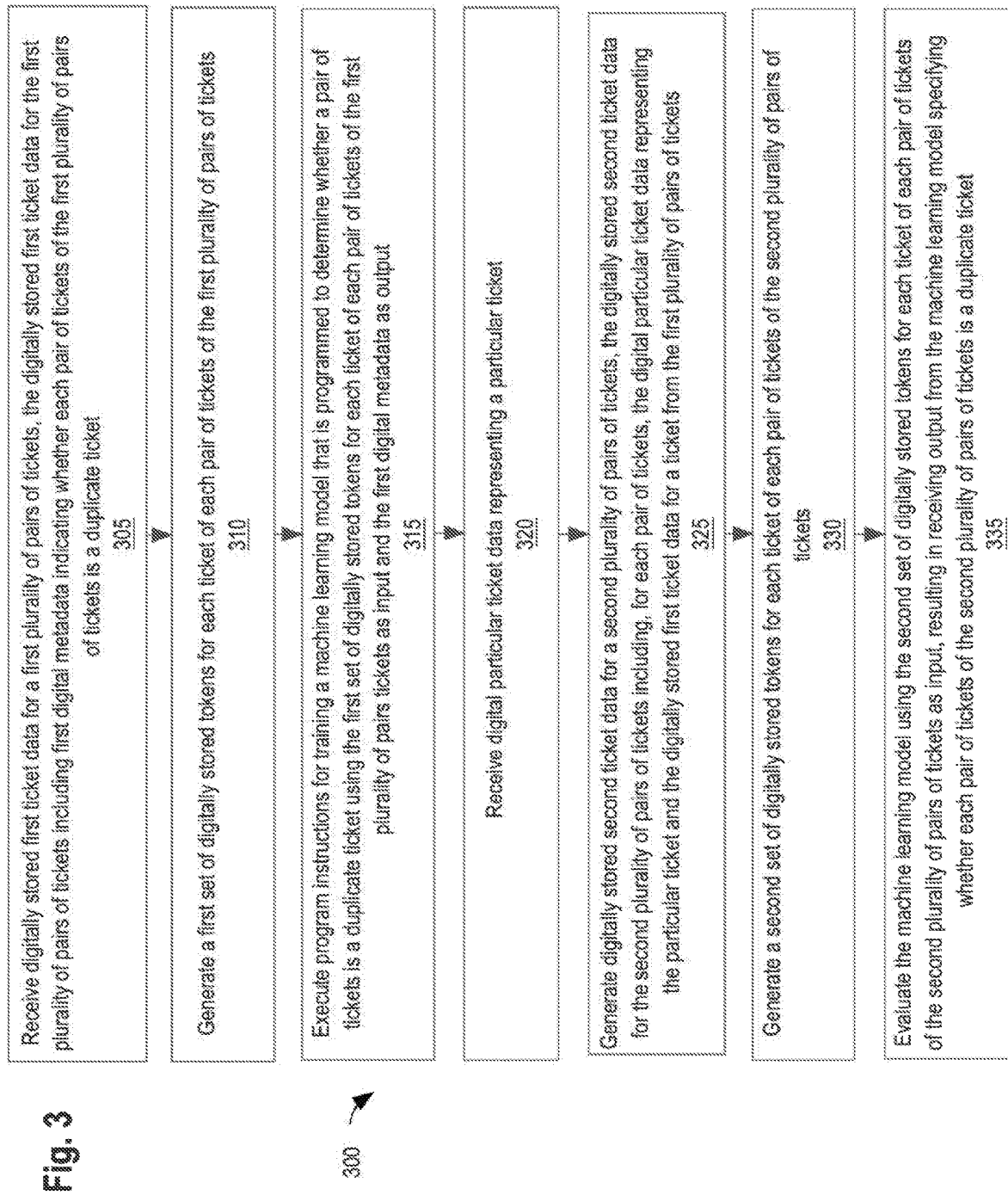
FIG. 3 illustrates an example flowchart of a method for using a machine learning system to detect duplicate tickets in federated collaboration systems.

FIG. 3 shows an example flowchart of a method for validating recommendation models in federated collaboration systems.

Although the steps in FIG. 3 are shown in an order, the steps of FIG. 3 may be performed in any order and are not limited to the order shown in FIG. 3. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 305, digitally stored first ticket data for a first plurality of pairs of tickets is received. The digitally stored first ticket data for the first plurality of pairs of tickets includes first digital metadata indicating whether each pair of tickets of the first plurality of pairs of tickets is a duplicate pair. For example, digitally stored first ticket data for a first plurality of pairs of tickets and/or first digital metadata may be stored in one or more data repositories local to the issue tracking system 101 or accessible via network 104. Digital ticket data may be stored that represents one or more tickets.

Figure 2:
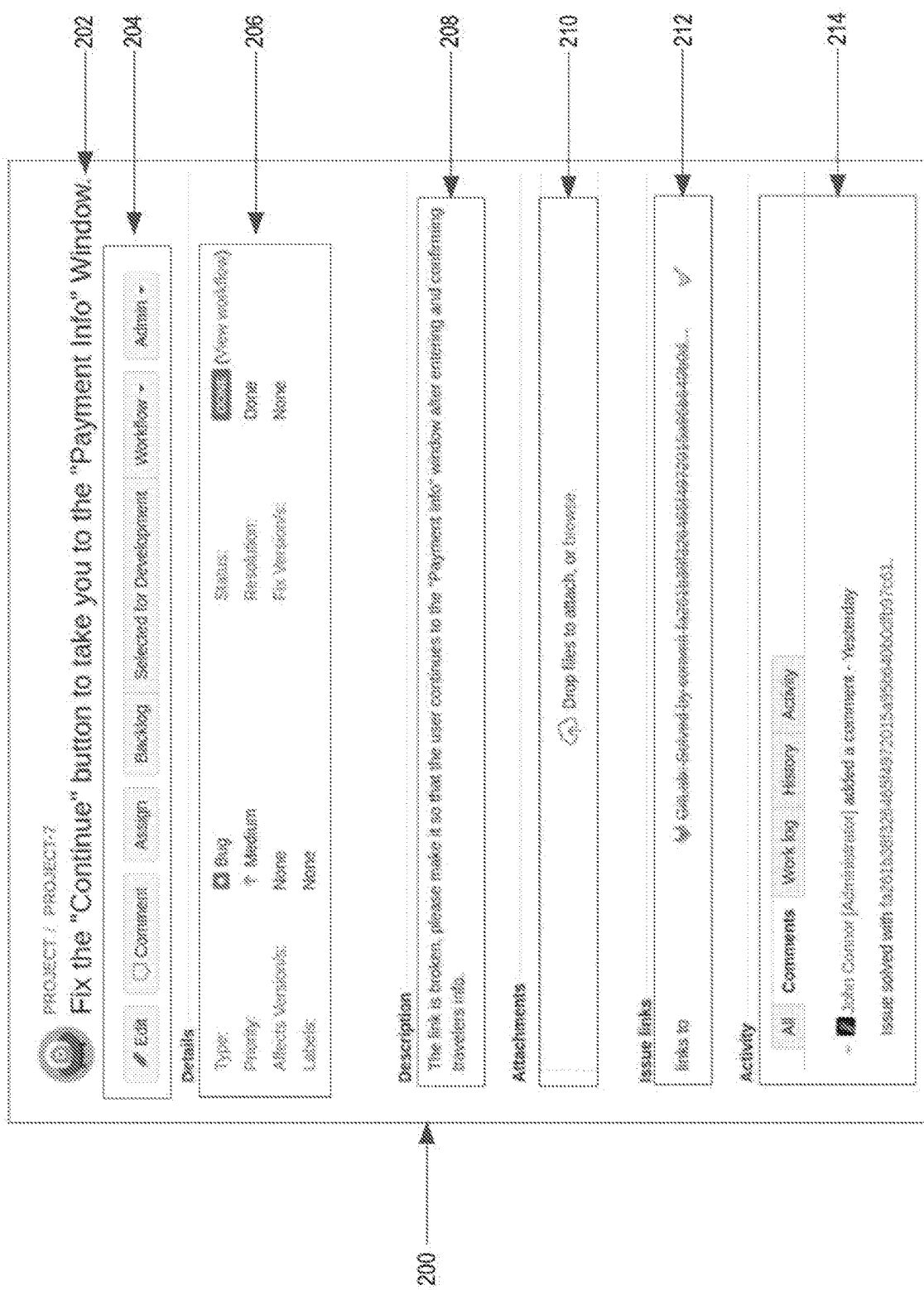
FIG. 2 illustrates an example graphical user interface for a ticket, according to an embodiment of the invention.

FIG. 2 illustrates an example graphical user interface for a ticket. For example, ticket 200 includes a variety of data fields. Ticket 200 includes a title data field 202 that indicates the title of the ticket 200. Ticket 200 includes action buttons 204 that allow a user to perform action functions on the ticket such as editing the ticket, commenting on the ticket, assigning the ticket, and backlogging the ticket. Ticket 200 includes detail data fields 206 that indicate the type of ticket, the priority associated with the ticket, labels associated with the ticket, the status of the ticket, resolution of the ticket, and version associated with the ticket. Ticket 200 includes a description field 208 that describes the purpose of the ticket. Ticket 200 includes an attachments field that allows a user to attach files to the ticket. Ticket 200 includes an issue links field 212 that allows the ticket to be linked to external sources such as source code repository system 105. Ticket 200 includes activity data fields 214 that provide a log of activity associated with the ticket such as a work log, comments on the ticket, and history of the ticket. FIG. 2 is one example of a ticket and many other versions of a ticket are possible.

As discussed above, digital data representing tickets may be stored in a data repository. A field in a data structure may indicate that a ticket is a duplicate of one or more other tickets and provide an identification of the one or more other tickets that the ticket is a duplicate of. Alternatively, the digital data representing the tickets may group tickets into pairs of duplicate tickets and store the duplicate pairs in separate data structure. Digital metadata stored in association with the digital data may indicate whether each the pair of tickets is a duplicate pair.

In an embodiment, a ticket may have a stack trace and/or source code associated with the ticket. For example, a file containing a stack trace or source code may be attached to a ticket using an attachments field 210 as shown in FIG. 2. Alternatively, a stack trace or source code may be written in text from into a description filed 208 or comments section 214 of a ticket. A stack trace or source code may also be linked to a source code repository system 105 as shown in issue links 212.

In an embodiment, digital data representing a stack trace or source code associated with each ticket of the first plurality of pairs of tickets is identified. For example, the server computer system 106 may use various techniques to determine that an attachment to a ticket represents a stack trace or source code. The server computer system 106 may also determine, for example, that text existing in a comments section of a ticket represents a stack trace or source code.

In step 310, a first set of digitally stored tokens for each ticket of each pair of tickets of the first plurality of pairs of tickets is generated. For example, for the plurality of tickets identified by the digitally stored first ticket data, the token generator 112 generates digital tokens. Digital tokens are generated for each ticket of each pair of tickets of the first plurality of tickets to form a first set of digital tokens. The first set of digital tokens may then be stored in a data repository accessible by the server computer system 106.

A mapping may be stored that maps subsets of digital tokens from the first set of digitally stored tokens to each ticket of each pair of tickets of the first plurality of pairs of tickets. Thus, the first set of digitally stored tokens includes a plurality of subsets of digitally stored tokens, each subset of the plurality of subsets of digitally stored tokens corresponding to each ticket of each pair of tickets of the first plurality of pairs of tickets.

In an embodiment, once a stack trace or source code is identified, a third set of digitally stored tokens for each stack trace or source code associated with each ticket of each pair of tickets of the first plurality of pairs of tickets is generated. Similar to generating a set of tokens for each ticket, a set of tokens is generated for each stack trace or source code associated with each ticket. Additionally, a mapping may be stored that maps subsets of digital tokens from the third set of digitally stored tokens to each ticket of each pair of tickets of the first plurality of pairs of tickets. Thus, the third set of digitally stored tokens includes a plurality of subsets of digitally stored tokens, each subset of the plurality of subsets of digitally stored tokens corresponding to each ticket of each pair of tickets of the first plurality of pairs of tickets.

As described above with respect to step 205 and FIG. 2, a ticket may comprise a variety of data fields which may be tokenized. The token generator 112 divides text retrieved from ticket data fields into a sequence of tokens, which roughly correspond to "words". The generated set of tokens becomes input for further processing, such as input to machine learning models, as described herein.

For example, the token generator 112 is configured break up a string from the 'Description' or 'Title' field of a ticket into individual terms or words based on whitespace or punctuation marks such as a comma, semi-colon, or period etc.

The token generator 112 may include one or more token filters, which are configured to change terms, remove terms, or add terms. A number of different token filters are described below by way of example.

A lowercase token filter may be provided which is configured to change all uppercase letters into lower case letters for the inverted index. If a similar token filter is used for search strings this renders searches case insensitive.

A common character/word token filter may be provided which is configured to prevent single characters (such as I or A) and common words (such as "the") from being included in the set of tokens.

Source code and/or stack traces may include descriptors/terms written in certain coding conventions. One example of such a convention is 'camel case' where compound words or phrases are written such that each word or abbreviation in the middle of the phrase begins with a capital letter. Camel case may start with a capital letter or with a lowercase letter. An example of camel case may be the term "riotPolice". Another example of such a convention is 'kebab case', where compound words/phrases are written separated by a hyphen—like 'riot-police'. A further example of such a convention is 'snake case', where compound words/phrases are written separated by an underscore—like 'riot_police'.

In order to account for such conventions special handling is required. For example, under normal processing a search for "Riot police" or "Riot AND police" may not identify one or more of the terms 'riotPolice' or 'riot-police' or 'riot_police' as these were considered one word by the token generator 112.

To account for this, the token generator 112 may include any of several different token filters such as a camel case token filter, a kebab-case token filter and/or a snake case token filter.

A camel case token filter may be configured to identify a camel case word if it encounters a word that has one or more capital letters in the middle of a continuous string of alpha-numeric characters. Examples include letters or numbers without spaces). When such words are encountered, the camel case token filter adds multiple terms to the token set for the camel case term. For example, if the term abstractRiot was encountered, the camel case token filter would add the terms abstract, riot, and abstractriot to the token set. Similarly, abstractRiotPolice was encountered, the camel case token filter may add the terms abstractriot, abstractriotpolice, riotpolice, abstract, riot, and police to the token set.

A kebab case token filter may be configured to identify a kebab case word if it encounters a continuous string of alpha-numeric characters that includes one or more hyphens. In this case, and like the camel case token filter described above, the kebab case token filter can add appropriate terms to the token set. For example, if the term abstract-riot was encountered, the kebab case token filter would add the terms abstract, riot, abstractriot, and abstract-riot to the token set.

A snake case token filter may be configured to identify a snake case word if it encounters a continuous string of alpha-numeric characters that includes one or more underscores. In this case, and like the camel case token filter described above, the snake case token filter can add appropriate terms to the token set. For example, if the term abstract_riot was encountered, the kebab case token filter would add the terms abstract, riot, abstractriot, and abstract_riot to the token set.

In step 315, program instructions for training a machine learning model that is programmed to determine whether a pair of tickets is a duplicate pair are executed. The first set of digitally stored tokens for each ticket of each pair of tickets of the first plurality of pairs tickets is used as input to the machine learning model and the first digital metadata is used as output to the machine learning model. For example, the first set of digitally stored tokens generated in step 310 are used as input to a machine learning model such as detection model 114. Detection model 114 may comprise an internally developed machine learning model or be coupled to external artificial intelligence libraries 112 to implement a machine learning algorithm. The first digital metadata is used as output to the machine learning model.

As discussed with respect to steps 305 and 310, a mapping is stored that maps subsets of digital tokens from the first set of digitally stored tokens to each ticket of each pair of tickets of the first plurality of pairs of tickets. Thus, the server computer system can use the mapping, the digitally stored first ticket data and the first digital metadata to identify pairs of subsets of digital tokens from the first set of digitally stored tokens that represent duplicate tickets and/or duplicate pairs.

In an embodiment, the third set of digitally stored tokens for each stack trace of each ticket of each pair of tickets of the first plurality of pairs of tickets is used as input to the machine learning model and the first digital metadata is used as output to the machine learning model.

As discussed with respect to steps 305, 310, a mapping is stored that maps subsets of digital tokens from the third set of digitally stored tokens to each ticket of each pair of tickets of the first plurality of pairs of tickets. Thus, the server computer system can use the mapping, the digitally stored first ticket data and the first digital metadata to identify pairs of subsets of digital tokens from the third set of digitally stored tokens that represent duplicate tickets and/or duplicate pairs.

In an embodiment, the machine learning model comprises a set of program instructions that implement a neural network. The neural network may comprise an artificial neural network, as discussed herein.

In step 320, digital particular ticket data representing a particular ticket is received. For example, the server computer system may receive digital particular ticket data via network 104 from the issue tracking system 101. The digital partial ticket data comprises data representing a ticket. The digital particular ticket data may be received in response to a ticket being created by a user in the issue tracking system 101.

In an embodiment, digital particular stack trace data representing a particular stack trace associated with the particular ticket is received. In another embodiment, digital particular source code data representing particular source code associated with the particular ticket is received.

In step 325, digitally stored second ticket data for a second plurality of pairs of tickets is generated. The digitally stored second ticket data for the second plurality of pairs of tickets includes, for each pair of tickets, the digital particular ticket data representing the particular ticket and the digitally stored first ticket data for a ticket from the first plurality of pairs of tickets. For example, in response to receiving the digital particular ticket data representing a particular ticket in step 320, the server computer system 106 generates digitally stored second ticket data for a second plurality of pairs of tickets.

The goal in generating the digitally stored second ticket data for the second plurality of pairs of tickets is to generate a set of unique pairs of tickets using the existing tickets already stored in the system i.e. using the digitally stored first ticket data for the first plurality of pairs of tickets, and combining each of those tickets with the particular ticket from the digital particular ticket data. Thus, each pair of tickets of the second plurality of pairs of tickets comprises the particular ticket from the digital particular ticket data and a ticket from the first plurality of pairs of tickets from the digitally stored first ticket data.

In an embodiment, a stack trace or source code is associated with each ticket of each pair of tickets of the second plurality of pairs of tickets.

In step 330, a second set of digitally stored tokens for each ticket of each pair of tickets of the second plurality of pairs of tickets is generated. For example, for the plurality of tickets identified by the digitally stored second ticket data, the token generator 112 generates digital tokens. Digital tokens are generated for each ticket of each pair of tickets of the first plurality of tickets to form a first set of digital tokens. The second set of digital tokens may then be stored in a data repository accessible by the server computer system 106. Digitally stored tokens may be generated using techniques discussed in step 310.

A mapping may be stored that maps subsets of digital tokens from the second set of digitally stored tokens to each ticket of each pair of tickets of the second plurality of pairs of tickets. Thus, the second set of digitally stored tokens includes a plurality of subsets of digitally stored tokens, each subset of the plurality of subsets of digitally stored tokens corresponding to each ticket of each pair of tickets of the second plurality of pairs of tickets.

In an embodiment, a fourth set of digitally stored tokens for each stack trace or source code associated with each ticket of each pair of tickets of the second plurality of pairs of tickets is generated. Similar to how the second set of digitally stored tokens, as discussed above, is generated, a fourth set of digitally stored tokens is generated. The fourth set of digitally stored tokens comprises subsets of digitally stored tokens each corresponding to a stack trace or source code associated with a ticket of each pair of tickets of the second plurality of pairs of tickets. A mapping may be stored that maps subsets of digital tokens from the fourth set of digitally stored tokens to each ticket of each pair of tickets of the second plurality of pairs of tickets.

In step 335, the machine learning model is evaluated using the second set of digitally stored tokens for each ticket of each pair of tickets of the second plurality of pairs of tickets as input, resulting in receiving output from the machine learning model specifying whether each pair of tickets of the second plurality of pairs of tickets is a duplicate pair. For example, the second set of digitally stored tokens generated in step 330 are used as input to the machine learning model such as detection model 114. Detection model 114 may comprise an internally developed machine learning model or be coupled to external artificial intelligence libraries 112 to implement a machine learning algorithm. As a result, the machine learning model produces output specifying whether each pair of tickets of the second plurality of pairs of tickets is a duplicate pair.

In an embodiment, the output may specify whether each pair of subsets of digitally stored tokens of the second set of digitally stored tokens are duplicate pairs. Using the mapping that maps subsets of digital tokens from the second set of digitally stored tokens to each ticket of each pair of tickets of the second plurality of pairs of tickets, it may be determined which pairs of tickets of the second plurality of pairs of tickets are duplicate pairs.

In an embodiment, the machine learning model is evaluated using the fourth set of digitally stored tokens for each stack trade or source code associated with each ticket of each pair of tickets of the second plurality of pairs of tickets as input to result in receiving output from the machine learning model specifying whether each pair of tickets of the second plurality of pairs of tickets is a duplicate pair. Using the mapping that maps subsets of digital tokens from the fourth set of digitally stored tokens to each ticket of each pair of tickets of the second plurality of pairs of tickets, it may be determined which pairs of tickets of the second plurality of pairs of tickets are duplicate pairs.

In an embodiment, in response to determining that a particular pair of tickets of the second plurality of pairs of tickets is a duplicate pair, a digital data display is generated and displayed comprising a notification indicating that a ticket of the particular pair of tickets is a duplicate ticket. For example, the machine learning model from step 335 may evaluate digitally stored tokens associated with a particular pair of tickets to a determine a probability that the particular pair of tickets is a duplicate pair. If the probability that the particular pair of tickets is a duplicate pair is above a threshold value, the particular pair of tickets is determined to be a duplicate pair. The server computer system 106 then generates a notification that a ticket is a duplicate ticket or that a pair of tickets is a duplicate pair. The notification may be delivered to a computing device associated with a user and caused to be displayed graphically on a computer device.

In another example, a user may provide feedback via the issue tracking system 101 that a ticket is a duplicate ticket or that a pair of tickets is a duplicate pair. This action may be accomplished by the user selecting that a ticket is a duplicate ticket using a graphical user interface and transmitting the result to the server computer system 106.

In an embodiment, second digital metadata is received indicating that a particular pair of tickets of the second plurality of pairs of tickets is a duplicate pair. For example, a user may provide feedback via the issue tracking system 101 that a ticket is a duplicate ticket or that a pair of tickets is a duplicate pair. This action may be accomplished by the user selecting that a ticket is a duplicate ticket using a graphical user interface and transmitting the result to the server computer system 106. In response to the user feedback, second digital metadata is generated and/or received by the server computer system 106 that indicates that a particular pair of tickets of the second plurality of pairs of tickets is a duplicate pair.

In one embodiment, the server computer system 106 may recommend to a user that a ticket is a duplicate ticket or that a particular pair of tickets is a duplicate pair in response to the machine learning model from step 335 determining a probability that the particular pair of tickets is a duplicate pair and the server computer system 106 determining that the probability of the particular pair of tickets is a duplicate pair is above a threshold value. Feedback regarding whether the particular pairs of tickets is a duplicate pair may be provided by a user, as discussed in other embodiments, and transmitted to the server computer system 106 as second digital metadata. Then, using the digitally stored tokens for each ticket of the particular pair of tickets from the second set of digitally stored tokens as input and second digital metadata indicating the particular pair of tickets of the second plurality of pairs of tickets is a duplicate pair as output, executing the program instructions for training the machine learning model.

Thus, allowing a user to make the final determination of whether a pair of tickets is a duplicate pair provides valuable data that is used as a feedback loop to further train the machine learning model discussed in steps 315 and 335 so that the machine learning model can more accurately make predictions regarding whether a ticket is a duplicate ticket or a pair of tickets is a duplicate pair.

In an embodiment, a ticket may have a stack trace and/or source code associated with the ticket. For example, a file containing a stack trace or source code may be attached to a ticket using an attachments field 210 as shown in FIG. 2. Alternatively, a stack trace or source code may be written in text from into a description filed 208 or comments section 214 of a ticket. A stack trace or source code may also be linked to a source code repository system 105 as shown in issue links 212.

In an embodiment, a master neural network transforms a plurality of different inputs into one or more probability values that indicate whether of a pair of tickets is a duplicate pair. The master neural network may comprise an artificial neural network with one or more neural network layers. Each layer of the master neural network may be configured to calculate a probability that a particular data item pair associated with a pair of tickets is a duplicate pair. For example, a first layer of the neural network layers may be trained to compute a probability that a pair of tickets is a duplicate pair based on tokenizing the description data fields of each ticket and using the digital tokens representing the description data fields as input to a machine learning model, as discussed with respect to steps 305-335. Using this layer, the probability that a particular pair of tickets is a duplicate pair is based on the description data fields of each ticket.

As another example, a second layer of the neural network layers may be trained to compute a probability that a pair of tickets is a duplicate pair based on tokenizing the comment data fields of each ticket and using the digital tokens representing the comment data fields as input to a machine learning model. Using this layer, the probability that a particular pair of tickets is a duplicate pair is based on the comment data fields of each ticket.

As another example, a third layer of the neural network layers may be trained to compute a probability that a pair of tickets is a duplicate pair based on tokenizing the stack traces associated with each ticket and using the digital tokens representing the stack traces as input to a machine learning model. Using this layer, the probability that a particular pair of tickets is a duplicate pair is based on the stack traces of each ticket.

In an embodiment, the master neural network is configured to accept as input at least the output probabilities of each neural network layer to determine whether a pair of tickets is a duplicate pair. The master neural network is trained to combine the probabilities of each neural network layer and produce an output specifying whether a pair of tickets is a duplicate pair. The probabilities calculated by each neural network layer may be weighted by the master neural network and may use standard machine learning techniques to update the weights over time. For example, a particular probability from a neural network layer may provide a more accurate prediction of whether a pair of tickets is a duplicate pair than the other neural network layers. The master neural network weights the particular probability higher than the other probabilities using standard machine learning techniques based on the training data set and the expected outputs.

4. Technical Benefits

The methods described herein provide a computing device with a method of detecting duplicate tickets in federated collaboration systems using a machine learning system. By detecting duplicate tickets, storage space associated with an issue tracking system can be drastically improved by removing duplicates from the system. Additionally, detecting duplicate tickets can improve the efficiency and efficacy of an issue tracking system by preventing duplicate tickets from forming segregated branches of the same issue that may lead to duplicate efforts and resolutions by users of the issue tracking system.

Additionally, the methods described herein allows the computer device to produce better machine learning models than previously possible, because the computer device is continuously retrained on data using a real-time user feedback loop that allows the machine learning model to become more accurate over time. Furthermore, stack traces and source code identifications may produce more accurate duplication predictions by the machine learning model, leading to quicker and a higher number of identifications of duplicates resulting in a conservation of storage, memory, and other computing resources.

5. Machine Learning Models

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN).

6. Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
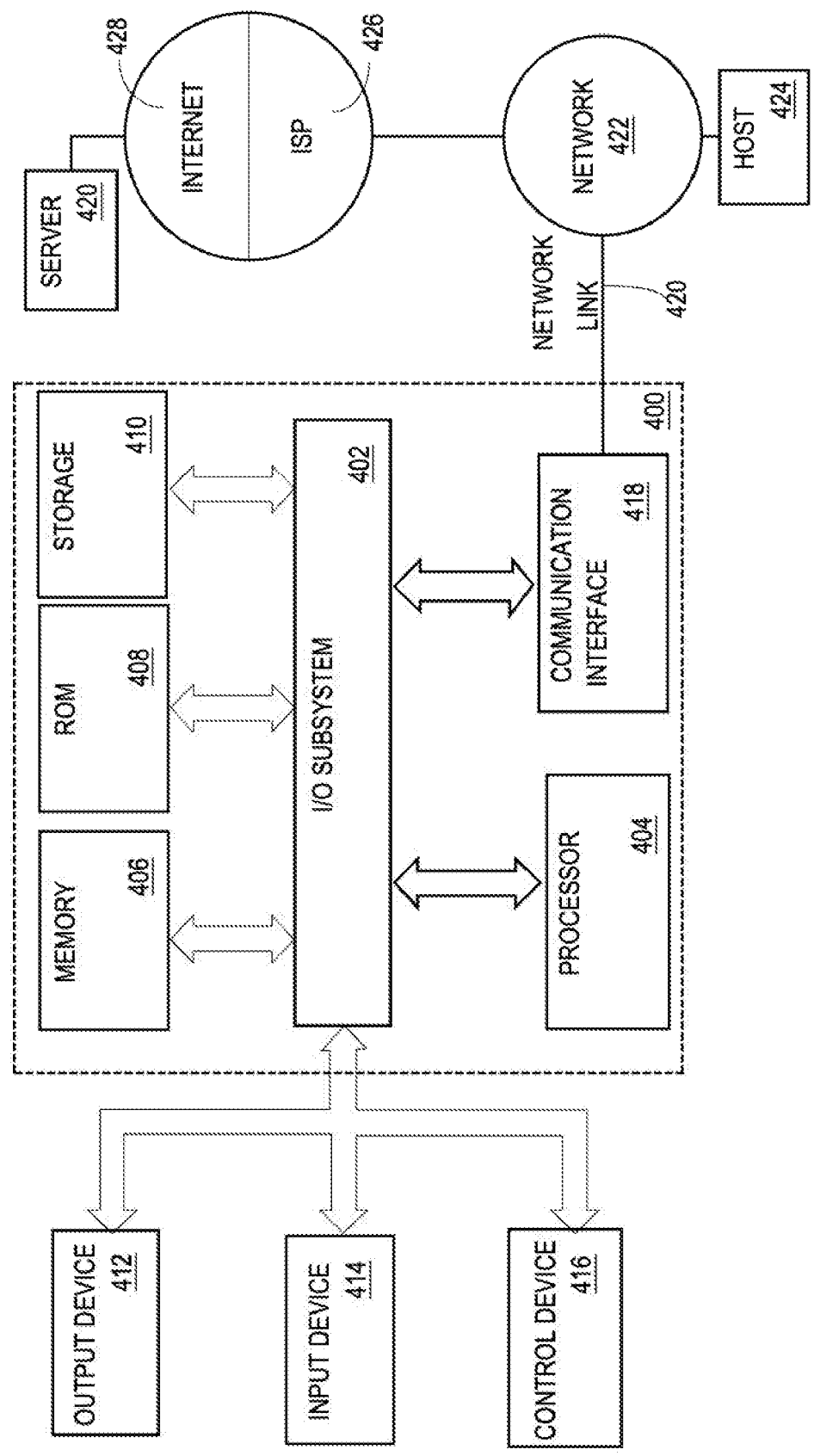
FIG. 4 shows a block diagram of a computer system with which an embodiment of the invention may be implemented.

FIG. 4 is a block diagram that illustrates an example computer system with which an embodiment may be implemented.

In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 204. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 208 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving, at a server computer, digitally stored first ticket data for a first plurality of pairs of tickets, the digitally stored first ticket data for the first plurality of pairs of tickets including first digital metadata indicating whether each respective pair of tickets of the first plurality of pairs of tickets is a respective duplicate pair;
generating, by the server computer, a first set of digitally stored tokens for each ticket of each respective pair of tickets of the first plurality of pairs of tickets;
identifying at least one of stack trace data or source code data associated with each ticket of at least a subset of tickets of the first plurality of pairs of tickets, each of the at least one of the stack trace data or the source code data corresponding to a respective portion of a computer code associated with each ticket of the at least the subset of tickets of the first plurality of pairs of tickets;
generating, by the server computer, a third set of digitally stored tokens for each of the at least one of the stack trace data or the source code data;
using the first set of digitally stored tokens and the third set of digitally stored tokens as a first input and the first digital metadata as a first output, executing program instructions for training a machine learning model that is programmed to detect duplicate ticket pairs;
receiving, at the server computer, digital particular ticket data representing a particular ticket;
generating, by the server computer, digitally stored second ticket data using a second plurality of pairs of tickets, each respective pair of tickets of the second plurality of pairs of tickets including the particular ticket and a respective ticket of the first plurality of pairs of tickets;
generating, by the server computer, a second set of digitally stored tokens for each ticket of each pair of tickets of the second plurality of pairs of tickets; and
evaluating the machine learning model using the second set of digitally stored tokens as a second input, resulting in receiving a second output from the machine learning model indicating whether the particular ticket is a duplicate ticket with respect to the respective ticket of the first plurality of pairs of tickets.

2. The method of claim 1, further comprising, in response to determining that the particular ticket is a duplicate ticket, generating and causing display of a digital data display comprising a notification that the particular ticket is the duplicate ticket.

3. The method of claim 1, further comprising:
receiving, at the server computer, second digital metadata indicating that a particular pair of tickets of the second plurality of pairs of tickets is a duplicate pair; and
using the second set of digitally stored tokens as a third input and second digital metadata indicating the particular pair of tickets of the second plurality of pairs of tickets is the duplicate pair as a third output, executing the program instructions for training the machine learning model.

4. The method of claim 1, further comprising:
identifying at least one of particular stack trace data or particular source code data representing a particular stack trace or a particular source code associated with the particular ticket;
generating, by the server computer, a fourth set of digitally stored tokens for each of the at least one of the particular stack trace data or the particular source code data; and
evaluating the machine learning model using the fourth set of digitally stored tokens as a third input to obtain a third output specifying whether each pair of tickets of the second plurality of pairs tickets is a duplicate pair.

5. The method of claim 1, wherein the machine learning model comprises a set of program instructions that implement an artificial neural network.

6. The method of claim 1, further comprising computing a probability that each pair of tickets of the second plurality of pairs of tickets is a duplicate pair.

7. The method of claim 1, wherein the second output from the machine learning model specifies a set of probability values, each probability value of the set of probability values indicating the probability of a pair of tickets of the second plurality of pairs of tickets being a duplicate pair.

8. The method of claim 7, further comprising, in response to determining that a particular probability value of the set of probability values is above a threshold value, determining that the pair of tickets corresponding to the particular probability value is the duplicate pair.

9. The method of claim 1, wherein the first set of digital tokens and the second set of digital tokens are generated by a token generator, the token generator configured to use a token filter to change, remove, or add terms indicated in a field of each ticket of each pair of tickets of the first plurality of pairs of tickets and the second plurality of pairs of tickets.

10. The method of claim 1, further comprising storing a mapping that maps subsets of digital tokens from the first set of digital tokens to each ticket of each pair of tickets of the first plurality of pairs of tickets.

11. The method of claim 1, wherein the first set of digitally stored tokens, the second set of digitally stored tokens, and the third set of digitally stored tokens are generated by a token generator, the token generator configured to divide text or code from ticket data fields and to apply one or more token filters to the text or code to generate the respective tokens.

12. One or more non-transitory computer-readable media storing instructions which, when executed by one or more processors, cause the one or more processors to:
receive, at a server computer, digitally stored first ticket data for a first plurality of pairs of tickets, the digitally stored first ticket data for the first plurality of pairs of tickets including first digital metadata indicating whether each respective pair of tickets of the first plurality of pairs of tickets is a respective duplicate pair;
generate, by the server computer, a first set of digitally stored tokens for each ticket of each respective pair of tickets of the first plurality of pairs of tickets;
identify at least one of stack trace data or source code data associated with each ticket of at least a subset of tickets of the first plurality of pairs of tickets, each of the at least one of the stack trace data or the source code data corresponding to a respective portion of a computer code associated with each ticket of the at least the subset of tickets of the first plurality of pairs of tickets;
generate, by the server computer, a third set of digitally stored tokens for each of the at least one of the stack trace data or the source code data;
using the first set of digitally stored tokens and the third set of digitally stored tokens as a first input and the first digital metadata as a first output, execute program instructions for training a machine learning model that is programmed to detect duplicate ticket pairs;
receive, at the server computer, digital particular ticket data representing a particular ticket;
generate, by the server computer, digitally stored second ticket data using a second plurality of pairs of tickets, each respective pair of tickets of the second plurality of pairs of tickets including the particular ticket and a respective ticket of the first plurality of pairs of tickets;
generate, by the server computer, a second set of digitally stored tokens for each ticket of each pair of tickets of the second plurality of pairs of tickets; and
evaluate the machine learning model using the second set of digitally stored tokens as a second input, resulting in receiving a second output from the machine learning model indicating whether the particular ticket is a duplicate ticket with respect to the respective ticket of the first plurality of pairs of tickets.

13. The one or more non-transitory computer-readable media of claim 12, further comprising instructions which, when executed by the one or more processors, cause the one or more processors to, in response to determining that the particular ticket is a duplicate ticket, generate and cause display of a digital data display comprising a notification that the particular ticket is the duplicate ticket.

14. The one or more non-transitory computer-readable media of claim 12, further comprising instructions which, when executed by the one or more processors, cause the one or more processors to:
receive, at the server computer, second digital metadata indicating that a particular pair of tickets of the second plurality of pairs of tickets is a duplicate pair; and
using the second set of digitally stored tokens as a third input and second digital metadata indicating the particular pair of tickets of the second plurality of pairs of tickets is the duplicate pair as a third output, execute the program instructions for training the machine learning model.

15. The one or more non-transitory computer-readable media of claim 12, further comprising instructions which, when executed by the one or more processors, cause the one or more processors to:
identify at least one of particular stack trace data or particular source code data representing a particular stack trace or a particular source code associated with the particular ticket;
generate, by the server computer, a fourth set of digitally stored tokens for each of the at least one of the particular stack trace data or the particular source code data; and
evaluate the machine learning model using the fourth set of digitally stored tokens as a third input to obtain a third output specifying whether each pair of tickets of the second plurality of pairs of tickets is a duplicate pair.

16. The one or more non-transitory computer-readable media of claim 12, wherein the machine learning model comprises a set of program instructions that implement an artificial neural network.

17. The one or more non-transitory computer-readable media of claim 12, further comprising instructions which, when executed by the one or more processors, cause the one or more processors to compute a probability that each pair of tickets of the second plurality of pairs of tickets is a duplicate pair.

18. The one or more non-transitory computer-readable media of claim 12, wherein the second output from the machine learning model specifies a set of probability values, each probability value of the set of probability values indicating the probability of a pair of tickets of the second plurality of pairs of tickets being a duplicate pair.

19. The one or more non-transitory computer-readable media of claim 18, further comprising instructions which, when executed by the one or more processors, cause the one or more processors to, in response to determining that a particular probability value of the set of probability values is above a threshold value, determine that the pair of tickets corresponding to the particular probability value is the duplicate pair.

20. The one or more non-transitory computer-readable media of claim 12, wherein the first set of digitally stored tokens, the second set of digitally stored tokens, and the third set of digitally stored tokens are generated by a token generator, the token generator configured to divide text or code from ticket data fields and to apply one or more token filters to the text or code to generate the respective tokens.

* * * * *